UNITED STATES PATENT OFFICE.

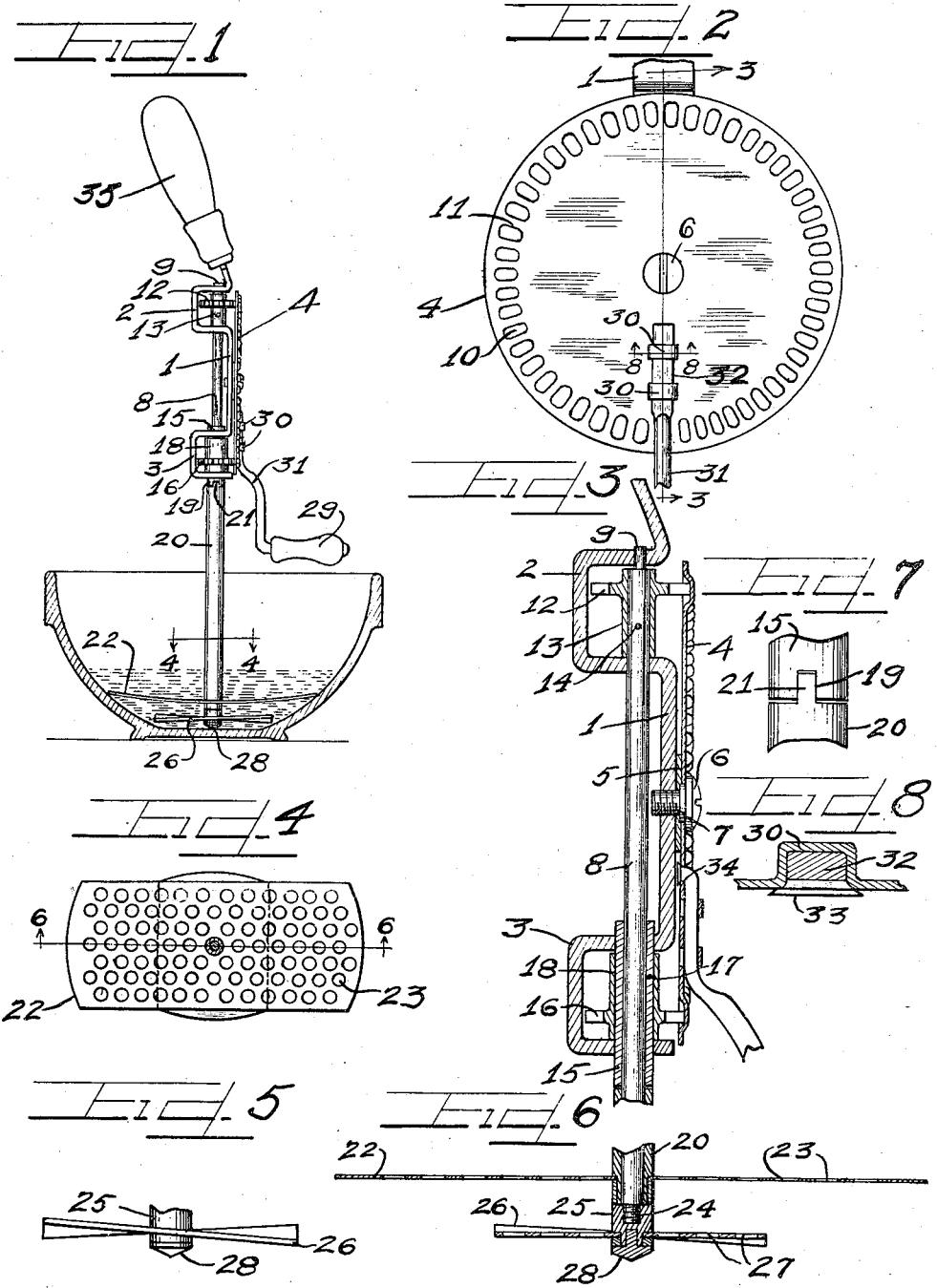

EUGENE C. BRULL, OF OAK PARK, ILLINOIS.

CREAM AND EGG WHIPPER.

1,322,874.

Specification of Letters Patent.

Patented Nov. 25, 1919.

Application filed April 12, 1918. Serial No. 228,134.

*To all whom it may concern:*

Be it known that I, EUGENE C. BRULL, a citizen of the United States, and a resident of the city of Oak Park, in the county of Cook and State of Illinois, have invented certain new and useful Improvements in Cream and Egg Whippers; and I do hereby declare that the following is a full, clear, and exact description of the same, reference being had to the accompanying drawings, and to the numerals of reference marked thereon, which form a part of this specification.

My invention has reference more particularly to a whipper or beater for cream, eggs or other materials, which has rotary agitators for thoroughly stirring the material.

The object of my invention is to provide a utensil of simple and economical construction which will more effectively whip cream, eggs and similar materials than devices heretofore provided.

Another object of my invention is to provide a whipper or beater having a plurality of oppositely rotating plates or agitators suitably constructed to thoroughly agitate and discompose the material operated upon.

Another object of my invention is to provide a whipper or beater with a plurality of concentric oppositely rotating agitators.

Another object of my invention is to provide a beater or whipper having a rotary member at the lower end arranged to cause vertical circulation or propulsion of the material and assure uniform agitation and stirring and prevent deposit of material at the bottom of the dish in which the device is operated.

Another object of my invention is to provide a beater having agitators which are detachable and enable the utensil to be thoroughly cleansed, or washed after using.

Another object of my invention is to provide a beater having an operating gear and a pair of diametrically opposite pinions for oppositely rotating a pair of agitating members.

My invention also has other important objects which will appear from the following specification and the accompanying drawing, in which I have described and shown a preferred form of my invention.

On the drawings:

Figure 1 is a side view of the beater or whipper inserted in a dish ready for operation.

Fig. 2 is an enlarged side view of the operating gear.

Fig. 3 is an enlarged sectional view on the line 3—3 of Fig. 2.

Fig. 4 is an enlarged sectional view on the line 4—4 of Fig. 1, showing a top view of the agitators.

Fig. 5 is a side view of the lower agitator.

Fig. 6 is an enlarged sectional view on the line 6—6 of Fig. 4.

Fig. 7 is an enlarged fragmentary side view of the sleeve coupling whereby the upper agitator is rendered detachable.

Fig. 8 is an enlarged sectional view on the line 8—8 of Fig. 2.

As shown on the drawings:

1, is the frame of the utensil which is made from a flat bar and suitably formed with yokes 2 and 3, one at each end thereof to provide housings for pinions journaled therein, and said frame is fashioned at the upper end to have the handle 3, attached thereto, said handle being inclined laterally or otherwise constructed or positioned to provide a convenient grip for holding the device during operation.

A gear plate 4, is journaled by means of the cap screw 6, on the frame 1, at one side thereof so as to extend over the yokes 2 and 3, said gear plate being spaced from the frame 1, by means of the interposed washer 5, so as to facilitate rotation thereof. The cap screw 6, is threaded into the frame 1, and has a shoulder 7, under the head thereof, which bears against the washer 5, and clamps same firmly against the frame 1, and said shoulder is of suitable width to hold the plate 4, which is journaled thereon firmly in position and permit it to turn freely without binding.

The gear plate 4, adjacent the outer edge thereof and opposite the yokes 2 and 3, is stamped outwardly to provide a plurality of indentations 10 arranged close together so as to form a series of corrugations around the margin of the gear plate, having the ribs 11, intermediate of the indentations 10, which ribs serve as gear teeth to coöperate with the teeth of a spur gear, and the indentations 10, provide a socket for the teeth of the spur gear, which enables same to straddle and engage the ribs 11, intermediate of the indentations.

The yokes 2 and 3, of the frame have alining perforations through which the shaft 8, is inserted parallel and spaced a short distance from the inner face of the plate 4, and the upper end of said shaft 8, is shouldered and provided with a reduced extension 9, which is inserted through the opening in the upper arm of the yoke 2.

A spur gear 12, is mounted on the upper end of the shaft 8, within the upper yoke 2, of the frame 1, so that the teeth thereof engage the teeth of the gear plate 4, and said gear has a sleeve 13, which is of suitable length to fit between the upper and lower arms of the yoke 2, and is pinned on the shaft as at 14. The shaft 8, is thereby required to turn with the gear 12, and the engagement of the ends of the sleeve 13, with the upper and lower arms of the yoke 2, and also the engagement of the upper shouldered end of the shaft 8, with the upper arm of the yoke, serves to limit the longitudinal movement of the shaft relatively to the frame 1.

The shaft 8, extends downwardly through enlarged openings in the lower yoke 3, and projects a considerable distance therebeyond so that an agitating member on the lower end thereof may be inserted in a deep bowl or dish without interfering with the manual operation of the gear plate 4, whereby it is driven. A sleeve 15, loosely telescopes the shaft 8, and is journaled in the upper and lower arms of the lower yoke 3, so as to rotate on the shaft 8, and has the pinion 16, secured thereon by means of the pin 17, so that the sleeve 15, is caused to turn with the pinion 16, which said pinion is in mesh with the gear teeth or corrugations at the margin of the gear plate 4.

Obviously the sleeve 15, and the shaft 8, by reason of the engagement of their respective pinions 15 and 12, with the corrugated gear teeth of the gear plate 4, and at opposite sides of the axis thereof are caused to rotate in opposite directions. The sleeve 15, is held against longitudinal movement by means of the hub 18, of the gear wheel 16, which fits between and engages against the upper and lower arms of the lower yoke 3, and the lower end of the sleeve 15, projects a short distance below the lower arm of the lower yoke 3 and is notched as at 19, to provide for clutch connection therewith. A sleeve or tube 20, loosely telescopes and extends to the lower end of the shaft 8, and has the lugs 21, at the upper end thereof adapted to be inserted in the notches 19, at the lower end of the sleeve 15, to provide detachable driving engagement therebetween, and at the lower end of the sleeve 20, a flexible elongated disk 22, is securely attached thereto so as to turn therewith and has a plurality of perforations 23, which, when the plate 22, is rapidly rotated, serve to stir and circulate the liquid. The lower end of the shaft 8, is shouldered and provided with a reduced threaded extension 24, whereby the hub 25, of the agitator 26, is detachably connected with the shaft 8, and said hub also serves to retain the sleeve 20, loosely on the shaft 8, so that same may freely turn thereon.

The agitator 26, is adapted to operate adjacent the bottom of the dish in which the egg or cream or other material is contained, and is preferably shorter than the agitator 22, and the surface thereof at opposite sides of the axis is inclined laterally as shown, so as to have a vertical propelling effect on the liquid in the dish so as to insure circulation of the liquid and impel it against the agitator 22 thereabove and also to prevent portions of material from settling to the bottom of the dish and remaining undisturbed. This agitator may also be provided with perforations 27, if desired to facilitate circulation and agitation of the liquid and the lower end of the hub 25, thereof is preferably provided with a hardened point 28, on convex bearing which engages the bottom of the dish and rotates thereagainst when the utensil is operated.

It is necessary that a utensil of this character may be thoroughly cleansed and washed after use, and for this purpose the hub 25, is detachably threaded on the lower end of the stem 8, and the hub 25, and the agitator 26, may be thereby removed and likewise the agitator 22, and its sleeve 20, by reason of its detachable connection at the upper end with the sleeve 15, may be withdrawn from the shaft 8, permitting all the parts of the device to be thoroughly cleansed and washed.

For rotating the gear plate 4, I have provided a handle 29, therefor which may be connected therewith in any suitable manner. In the present instance square loops 30, are pressed outwardly from the outer face of the gear plate 4, and the crank arm 31, of the handle 29, is squared at the inner end as shown at 32, and inserted through the square loops 30, and has the inner end thereof bent and riveted as at 33, through a perforation 34, in the gear plate 4.

The operation is as follows:

The egg, cream or other material to be whipped or beaten is placed in a dish and the beater is inserted therein in an upright position and held by means of the handle 3, with the lower end 28 thereof bearing against the bottom of the dish. The handle 29, is then rotated and the agitators 22 and 26, are rapidly revolved in reverse directions. The agitator 26, being constructed in a propeller form causes a circulation of the material from the bottom of the dish through its perforation 27, and also upwardly against the agitator 22, and through the perforations 23 thereof and causes a more effective beating or whipping of the material than can be obtained by any other device at present known to applicant. It will be observed that the agitator 22, is constructed of thin flexible material which will readily conform or yield to any engagement thereof with the disk without affecting the operation of the device.

After use the lower agitator 26, is unscrewed from the end of the shaft 8, and the upper agitator 22 and its sleeve is withdrawn from the shaft 8, whereupon all these parts which have been subjected to the material in the dish may be readily washed clean.

While I have shown my invention in a certain form, I am aware that various changes and modifications may be made therein without departing from the principles of my invention, and I therefore do not purpose limiting the patent granted hereon otherwise than necessitated by the prior art.

I claim as my invention:

1. In a device of the class described the combination of a supporting frame having a pair of concentric longitudinal members extending away from the frame, gearing on the frame for rotating said members, simultaneously in opposite directions, a flexible perforated plate on one of the members adapted to have the ends thereof deflected by engagement with the walls of a container when placed therein, and a propeller on the other member for circulating liquid in the container through the perforations of said plate.

2. In a device of the class described the combination of a supporting frame having a shaft and a sleeve around the shaft, both extending away from the frame, gearing on the frame, for rotating the shaft and sleeve simultaneously in opposite directions, a propeller at the outer end of the shaft for propelling material lengthwise of the shaft, and a flexible perforated plate on the sleeve between the frame and propeller and adapted to have the ends thereof deflected by engagement with the walls of a container when placed therein.

3. In a device of the class described the combination of a gear frame having a shaft extending therefrom and provided with a bearing at its outer end, a sleeve on the shaft, gearing on the frame, for rotating the shaft and sleeve simultaneously in opposite directions, detachable agitators on the sleeve and shaft, and a handle at the upper end of the gear frame for manually supporting the device upright on the bearing at the outer end of said shaft.

4. In a device of the class described, the combination of a frame, a shaft extending from the frame, gearing on the frame comprising tight and loose driven members on the shaft, adapted to be rotated simultaneously in opposite directions, a removable sleeve on the shaft having a clutch connection with the loose driven member, and provided with an agitator, and an agitator adapted to be detachably secured on the shaft so as to engage the clutch connection of the sleeve with the loose driven member.

In testimony whereof I have hereunto subscribed my name in the presence of two subscribing witnesses.

EUGENE C. BRULL.

Witnesses:
FRANK A. BREMER, Jr.,
FRED E. PAESLER.